(12) United States Patent
Chai et al.

(10) Patent No.: US 8,379,987 B2
(45) Date of Patent: Feb. 19, 2013

(54) METHOD, APPARATUS AND COMPUTER PROGRAM PRODUCT FOR PROVIDING HAND SEGMENTATION FOR GESTURE ANALYSIS

(75) Inventors: Xiujuan Chai, Beijing (CN); Yikai Fang, Beijing (CN); Hao Wang, Beijing (CN); Kongqiao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 1026 days.

(21) Appl. No.: 12/346,123

(22) Filed: Dec. 30, 2008

(65) Prior Publication Data
US 2010/0166258 A1  Jul. 1, 2010

(51) Int. Cl.
*G06K 9/46* (2006.01)
*G06K 9/00* (2006.01)

(52) U.S. Cl. ........................... 382/203; 382/103

(58) Field of Classification Search .................. 382/103, 382/106, 173, 203
See application file for complete search history.

(56) References Cited

U.S. PATENT DOCUMENTS

| | | | | |
|---|---|---|---|---|
| 6,072,494 | A * | 6/2000 | Nguyen | 715/863 |
| 6,144,366 | A * | 11/2000 | Numazaki et al. | 345/156 |
| 6,215,890 | B1 * | 4/2001 | Matsuo et al. | 382/103 |
| 6,434,255 | B1 * | 8/2002 | Harakawa | 382/103 |
| 2003/0113018 | A1 | 6/2003 | Nefian et al. | |
| 2003/0156756 | A1 * | 8/2003 | Gokturk et al. | 382/190 |
| 2008/0089587 | A1 | 4/2008 | Kim et al. | |
| 2008/0181459 | A1 * | 7/2008 | Martin et al. | 382/103 |
| 2010/0166258 | A1 * | 7/2010 | Chai et al. | 382/103 |

FOREIGN PATENT DOCUMENTS

| | | |
|---|---|---|
| WO | WO 03/009218 A1 | 1/2003 |
| WO | WO 03/071410 A2 | 8/2003 |
| WO | WO 2005/114556 A2 | 12/2005 |
| WO | WO 2008/038096 A1 | 4/2008 |

OTHER PUBLICATIONS

*A Real-Time Hand Tracker Using Variable-Length Markov Models of Behaviour*, Stefanov, N. et al., Comput. Vis. Image Understand. (2007), vol. (108), Issue 1-2, pp. 98-115, Oct. 2007.
*A Gesture Recognition System Using 3D Data*, Malassiotis, S. et al., Int. Conf. on 3D Data Processing Visualization and Transmission, pp. 190-193, 2002.
*Hand Gesture Recognition Using Multi-Scale Colour Features, Hierarchical Models and Particle Filtering*, Bretzner, L. et al., Proceedings of Int. Conf. on Automatic Face and Gesture Recognition, Washington, DC, May 2002, pp. 423-428.
Chung, J. et al., *Cue circles: Image Features for Measuring 3-D Motion of Articulated Objects Using Sequential Image Pair*, Proceedings, Third IEEE International Conference on Automatic Face and Gesture Recognition, (1998), pp. 1-6.
International Search Report and Written Opinion for Application No. PCT/IB2009/007751 mailed Mar. 26, 2010.

* cited by examiner

*Primary Examiner* — John Strege
(74) *Attorney, Agent, or Firm* — Alston & Bird LLP

(57) ABSTRACT

A method for providing hand segmentation for gesture analysis may include determining a target region based at least in part on depth range data corresponding to an intensity image. The intensity image may include data descriptive of a hand. The method may further include determining a point of interest of a hand portion of the target region, determining a shape corresponding to a palm region of the hand, and removing a selected portion of the target region to identify a portion of the target region corresponding to the hand. An apparatus and computer program product corresponding to the method are also provided.

17 Claims, 7 Drawing Sheets

METHOD, APPARATUS AND COMPUTER PROGRAM PRODUCT FOR PROVIDING HAND SEGMENTATION FOR GESTURE ANALYSIS

TECHNOLOGICAL FIELD

Embodiments of the present invention relate generally to user interface technology and, more particularly, relate to a method, apparatus and computer program product for providing hand segmentation for gesture analysis for visual interaction systems.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human to machine interfaces for HCI (human-computer interaction). With recent developments in the area of the computing devices and hand-held or mobile devices improving the capabilities of such devices, next generation HCI is on the minds of many. Furthermore, given that the devices will tend to increase in their capacity to create content, store content and/or receive content relatively quickly upon request, and given also that mobile electronic devices such as mobile phones often face limitations in display size, text input speed, and physical embodiments of user interfaces (UI), challenges are often created in the context of HCI.

Furthermore, improvements in HCI may also enhance user enjoyment and open possibilities for user interface with computing devices in environments that may otherwise have presented changes for effective HCI. One such improvement relates to gesture recognition. Compared with other interactive mechanisms currently employed in HCI such as, for example, keypad and mouse, some may consider gesture recognition to improve the naturalness and facility of communication. As such, certain applications have been developed to enable gesture recognition for use as a command controller in digital home appliances, for use in file/web navigation or for use as a substitute for the commonly used remote controller. However, current mechanisms for gesture analysis are often slow or cumbersome to employ. Given the general utility of next generation HCI, improvements in gesture analysis may be desirable.

BRIEF SUMMARY OF SOME EXAMPLES OF THE INVENTION

A method, apparatus and computer program product are therefore provided to enable the use of gesture analysis in, for example, a visual interaction system. In some cases, gesture analysis can be accomplished based on detecting and analyzing skin regions or the depth of objects in a three dimensional (3D) environment. However, since it may be the hand which is analyzed, or primarily analyzed, with respect to gesturing in certain situations, some embodiments of the present invention enable hand segmentation to isolate the hand from remaining portions of the image. By providing accurate hand segmentation, embodiments of the present invention may simplify gesture classification and improve recognition performance.

In an exemplary embodiment, a method of providing hand segmentation for gesture analysis is provided. The method may include determining a target region based at least in part on depth range data corresponding to an intensity image. The intensity image may include data descriptive of a hand. The method may further include determining a point of interest (e.g., an estimated center) of a hand portion of the target region, determining a shape (e.g., a circle) corresponding to a palm region of the hand, and removing a selected portion of the target region to identify a portion of the target region corresponding to the hand.

In another exemplary embodiment, a computer program product for providing hand segmentation for gesture analysis is provided. The computer program product includes at least one computer-readable storage medium having computer-executable program code instructions stored therein. The computer-executable program code instructions may include program code instructions for determining a target region based at least in part on depth range data corresponding to an intensity image. The intensity image may include data descriptive of a hand. The computer-executable program code instructions may further include program code instructions for determining a point of interest (e.g., an estimated center) of a hand portion of the target region, determining a shape (e.g., a circle) corresponding to a palm region of the hand, and removing a selected portion of the target region to identify a portion of the target region corresponding to the hand.

In another exemplary embodiment, an apparatus for providing hand segmentation for gesture analysis is provided. The apparatus may include a processor. The processor may be configured to determine a target region based at least in part on depth range data corresponding to an intensity image. The intensity image may include data descriptive of a hand. The processor may be further configured to determine a point of interest (e.g., an estimated center) of a hand portion of the target region, determine a shape (e.g., a circle) corresponding to a palm region of the hand, and remove a selected portion of the target region to identify a portion of the target region corresponding to the hand.

In yet another exemplary embodiment, an apparatus for providing hand segmentation for gesture analysis is provided. The apparatus may include means for determining a target region based at least in part on depth range data corresponding to an intensity image. The intensity image may include data descriptive of a hand. The apparatus may further include means for determining a point of interest (e.g., an estimated center) of a hand portion of the target region, means for determining a shape (e.g., a circle) corresponding to a palm region of the hand, and means for removing a selected portion of the target region to identify a portion of the target region corresponding to the hand.

Embodiments of the invention may provide a method, apparatus and computer program product for employment, for example, in mobile or fixed environments. As a result, for example, computing device users may enjoy an improved capability for interaction with their respective computing devices.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Figure 1C:
FIG. 1 (including FIGS. 1A through 1F) illustrates examples of image segmentation performed on the basis of depth ranges for objects within the image according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Figure 1F:
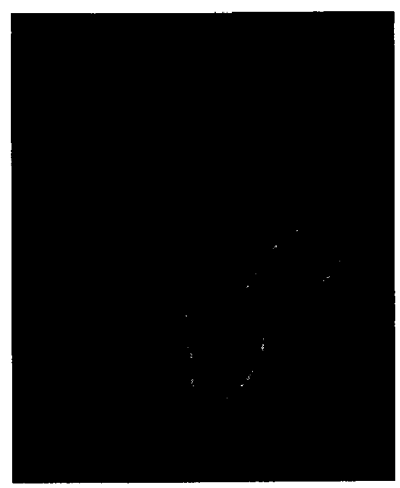
Figure 1B:
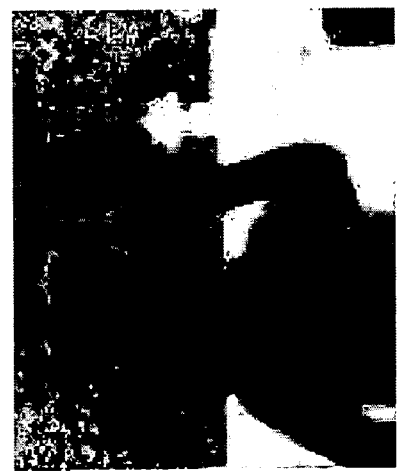
Figure 1E:
Figure 1A:
Figure 1D:

Some embodiments of the present invention may provide a mechanism by which improvements may be experienced in relation to gesture analysis. In this regard, for example, coarse segmentation based on depth ranges from 3D imaging for gesture analysis may result in segmentation of the forearm along with the hand. In some cases, including the forearm may increase the difficulty of gesture detection. For example, FIG. 1 illustrates examples of image segmentation performed on the basis of depth ranges for objects within the image to illustrate the problems that forearm inclusion may cause in gesture analysis. In this regard, FIGS. 1A and 1D show original intensity images. Analysis of the images may then be performed by examining an intensity image at various depth ranges if a 3D camera is used to obtain the intensity images such that objects at each depth range being analyzed are intensified and other objects are marginalized. FIGS. 1B and 1E show the depth range images of FIGS. 1A and 1D, respectively, which can be analyzed at a particular depth range. FIGS. 1C and 1F show the intensity images of FIGS. 1A and 1D, respectively, analyzed at a depth range of the hand. In this example, the hand is at the smallest or shallowest depth range (e.g., nearest to the camera). Thus, objects nearest to the camera are accentuated in the intensity image. Due to hand positioning, in some cases, the forearm, or portions of the forearm, may also be at or near the same depth range as the hand. As shown in FIGS. 1C and 1F, the forearm is therefore included along with the hand in the final segmented result. This may be referred to as hand and arm co-occurrence. Some embodiments of the present invention provide a mechanism by which to further segment images to exclude the forearm portion to enable more accurate gesture analysis by enabling analysis to focus on the hand portion itself.

Some embodiments of the present invention may provide a mechanism by which improvements may be experienced in relation to gesture analysis. In this regard, for example, some embodiments may provide for a real-time gesture analysis scheme, which may be suitable for interactive activities on hand-held or other computing devices. Thus, a user may be enabled to control a device (e.g., the hand-held or computing device of the user or even a remote device) by gesture rather than operating the device manually. Some exemplary embodiments may provide automatic gesture analysis via a scheme that integrates various components such as, for example, a 3D camera, a depth analyzer, a motion analyzer, a target tracker and a gesture recognizer. Target tracking, according to some embodiments of the present invention, may provide relatively accurate target (e.g., hand) location with a relatively low sensitivity to background, illumination, hand scale variation and movement, etc.

Figure 2:
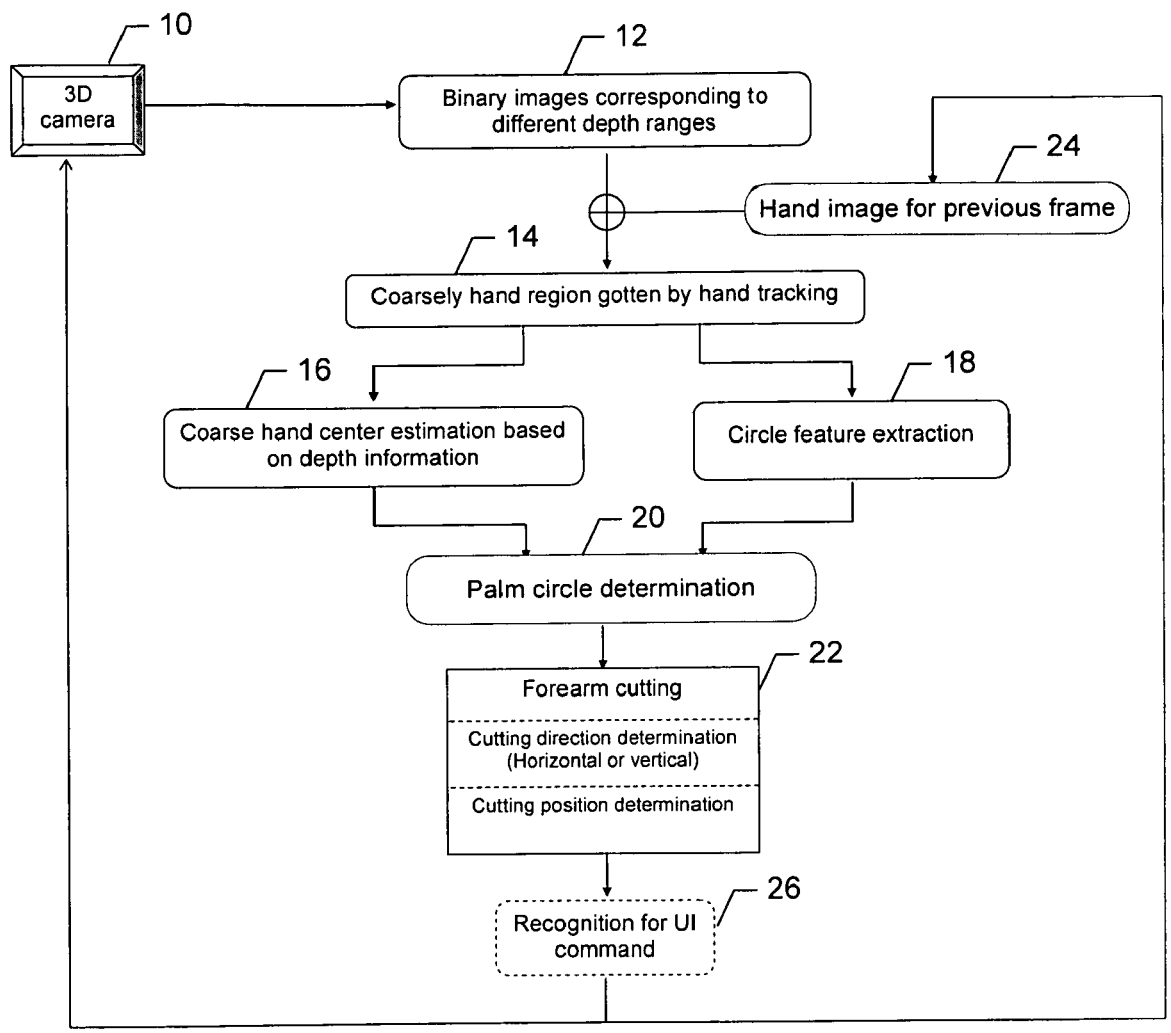
FIG. 2 illustrates one example of a hand segmentation process for gesture analysis for a user interface (UI) controller according to an exemplary embodiment of the present invention.

FIG. 2 illustrates one example of an adaptive gesture analysis process for a UI controller according to an exemplary embodiment of the present invention. In particular, an exemplary embodiment will be described below in the context of target detection based gesture analysis for hand gestures. It should be noted that the process of FIG. 2 is merely exemplary and thus other embodiments may include modifications such as the inclusion of additional or different operations, the same or different operations in a different order, and/or the deletion of some operations.

As shown in FIG. 2, which is a flow diagram showing various operations that may be conducted in association with an exemplary embodiment, image data (e.g., video data) may initially be captured at operation 10 by a 3D camera. The 3D camera may be associated with a device performing gesture recognition according to an exemplary embodiment insofar as the 3D camera may be a part of the device or in communication with the device. In some embodiments, communication between the camera and other components used in gesture analysis may be real-time or at least with relatively little delay. The 3D camera may be capable of providing 3D depth data and an intensity image simultaneously. In this regard, for example, the 3D camera may be capable of providing data separable into various different depth intervals. The depth intervals may be equidistant or may have varying distances therebetween. The 3D camera may be configured to extract depth data and intensity data from the image data captured. A frame of image data received at operation 10 may then be segmented into different depth ranges to provide intensity images at varying depth ranges at operation 12. The analysis of the image data may be conducted on a frame-by-frame basis such that an intensity image for a previous (or subsequent) frame may be compared to the segmented images for each respective different depth range. Motion differences may be analyzed at each depth range. Motion analysis with respect to adjacent frames may be useful in identifying a target area (e.g., a gesture capable appendage such as the hand) since in many situations the target which is performing the gesture may be expected to have the most change from one frame to the next. Thus, while depth of the target cannot necessarily be predicted, it may be predicted that the depth at which the target is located is expected to see more significant motion than other depths.

Based on motion analysis with respect to the various depth ranges, candidate depth ranges may be identified. In this regard, for example, candidate depth ranges showing motion above a certain threshold, or as a maximum or at least higher relative to other depth ranges or frames for a given depth range may be identified as candidate depth ranges. In some exemplary embodiments, one or more other cues (e.g., position, scale, and/or the like) may be considered along with the motion analysis of candidate depth ranges. Based on the motion of the candidate depth ranges (and in some cases also based on the cues), a coarse determination as to a hand region may be made by identifying and tracking a target region at operation 14. In some cases, the hand may be assumed to be at a nearest depth range to the camera. Thus, for example, instead of focusing on motion or other cues to determine a depth of the hand, an object having the smallest depth may be utilized for coarse hand region determination.

After coarse hand region determination, the process may continue with operations aimed at isolating the hand from the forearm. In this regard, depending on the view of the hand provided, the hand may generally include a circular feature corresponding to the palm. Embodiments of the present invention may implement circular feature determinations to augment coarse target region detection in order to more accurately determine or identify a hand within an image. Additionally, pixel distribution analysis concerning depth information may be used for making a rough estimation as to the center of the hand region (e.g., coarse hand center). Thus, for example, after coarsely determining the hand region at operation 14, which may result in isolation of a hand and forearm region, embodiments of the present invention may further include a coarse hand center determination based on depth information at operation 16. The coarse hand center determination operation may be augmented to utilize geometric information to identify the hand portion of an image. In this regard, identifying circle features may be useful in obtaining geometric information for this purpose. Accordingly, at operation 18, embodiments of the present invention may engage in circle feature extraction. Based on the circle features extracted and the hand center determination, a palm circle determination may be conducted at operation 20. The palm circle determination may further isolate the circle feature (among potentially a plurality of circle features) that corresponds to the palm of the hand.

Once the hand has been identified using the operations above, the forearm region may be cut out or otherwise removed from consideration at operation 22. The general operation of forearm cutting may include sub-operations of determining cutting direction and determining cutting position. What remains after operation 22 is a hand region that may be tracked on a frame-wise basis in order to determine gestures made with the hand. As such, the hand may continue to be tracked and motion or changes with respect to features that may be extracted from the target region being tracked (e.g., a hand region), may be used for gesture analysis. The tracking of hand position and changes associated therewith may be accomplished by comparing images in adjacent frames as indicated at operation 24. In an exemplary embodiment, gesture analysis may be performed by comparing features from the target region being tracked to features in a stored database of features that correspond to specific gestures. By determining a match (or substantial similarity to within a threshold amount) between features in the database (e.g., a matching database) and the features extracted from the target region being tracked, a gesture corresponding to the specific gesture associated with the matched features from the database may be recognized.

If a particular gesture is recognized, a corresponding command may be executed at operation 26. As such, for example, a database may store information associating gestures with respective commands or UI functions. Thus, for example, if a clenched fist is recognized while playing music or video content and the clenched fist is associated with a stop command, the music or video content being rendered may be stopped.

Figures 3A, 3B, 3C, 3D, 3E:
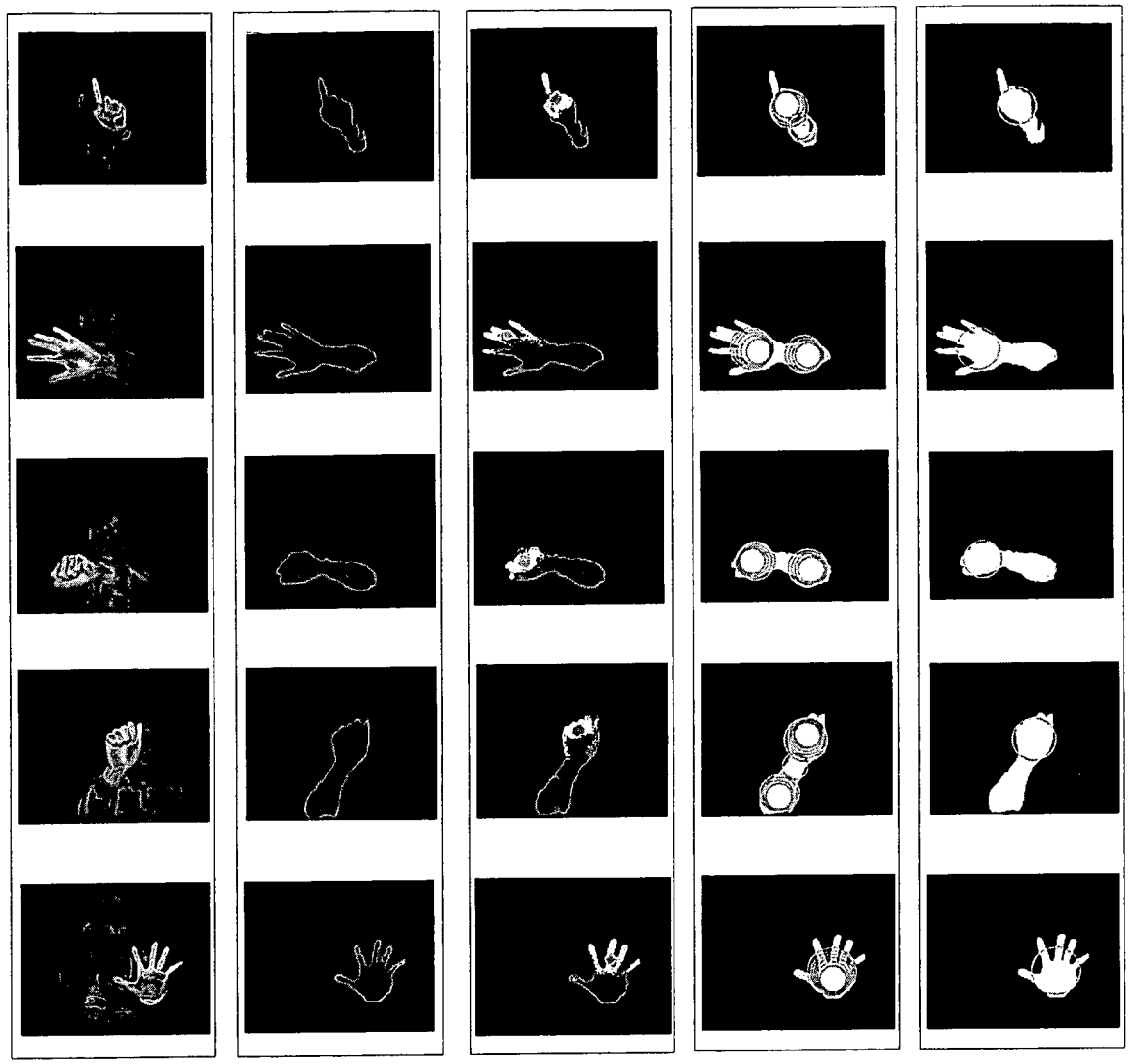
FIG. 3 (including FIGS. 3A through 3E) illustrates an example of the hand segmentation process with respect to various example images according to an exemplary embodiment of the present invention.

FIG. 3 illustrates an example of the above described operation according to an exemplary embodiment. In this regard, for example, FIG. 3A shows a series of intensity images captured. FIG. 3B illustrates the results of coarse hand detection based on depth analysis for each corresponding intensity image from FIG. 3A. FIG. 3C shows a rough hand center estimation indicated by a dot in each image relative to the course hand detection done in FIG. 3B. FIG. 3D shows a plurality of circular shapes, each of which identifies a corresponding circle feature from each corresponding intensity image of FIG. 3B. FIG. 3E shows a circle in each image. The circle in each image identifies the palm circle determined from among the circle features identified in FIG. 3D. Operation of an exemplary embodiment in relation to identifying the palm circle will be described below in greater detail for purposes of providing an example and not of limitation.

Figure 4:
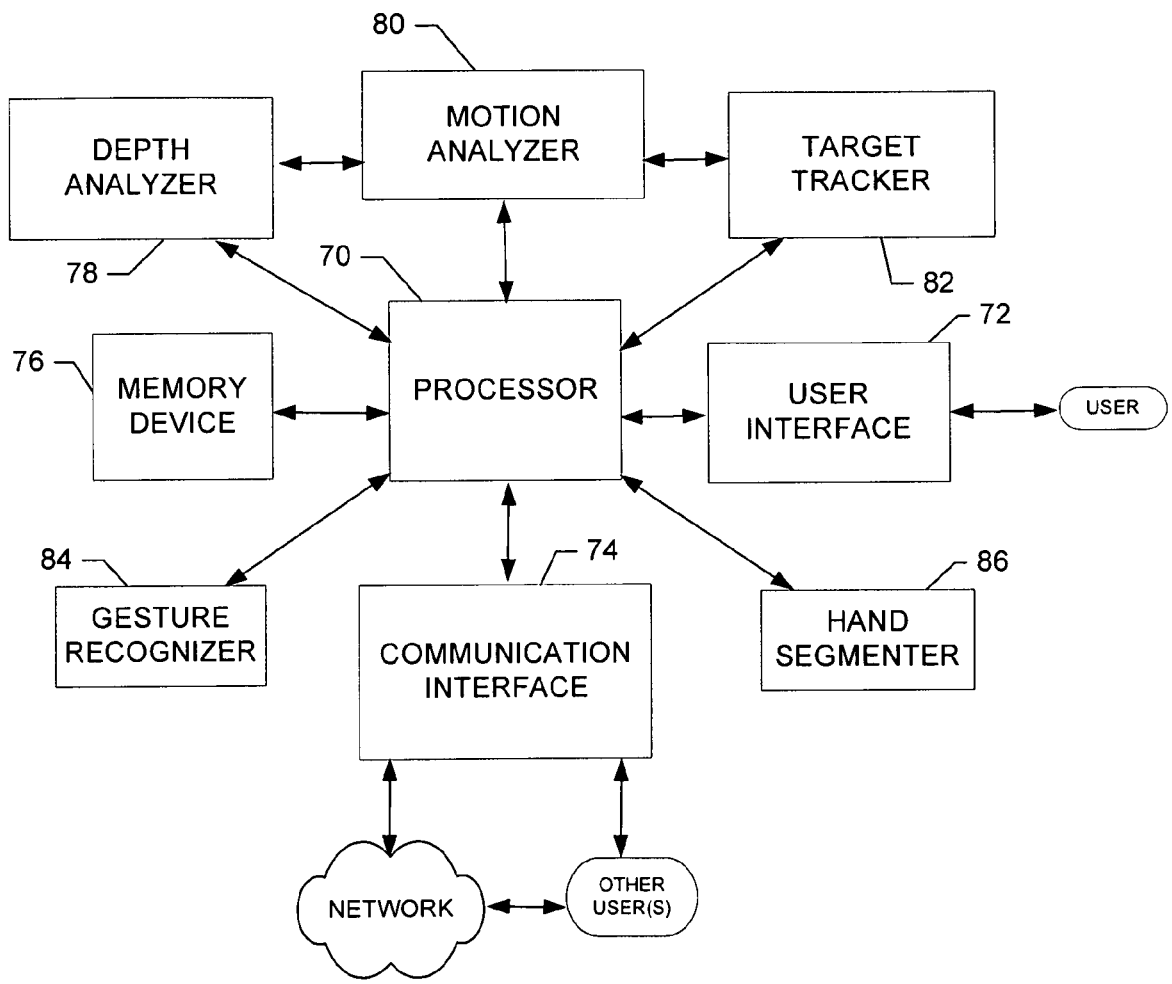
FIG. 4 illustrates a block diagram of an apparatus for providing hand segmentation for gesture analysis according an exemplary embodiment of the present invention.

FIG. 4 illustrates a schematic block diagram of an apparatus for enabling hand segmentation for gesture analysis according to an exemplary embodiment of the present invention. An exemplary embodiment of the invention will now be described with reference to FIG. 4, in which certain elements of an apparatus for enabling hand segmentation for gesture analysis are displayed. The apparatus of FIG. 4 may be employed, for example, on a mobile terminal (e.g., the mobile terminal 110 of FIG. 6) or a variety of other devices, both mobile and fixed (such as, for example, a network device, personal computer, laptop computer, or the like). Alternatively, embodiments may be employed on a combination of devices. Accordingly, some embodiments of the present invention may be embodied wholly at a single device (e.g., the mobile terminal 110) or by devices in a client/server relationship. Furthermore, it should be noted that the devices or elements described below may not be mandatory and thus some may be omitted in certain embodiments.

Referring now to FIG. 4, an apparatus for enabling hand segmentation for gesture analysis is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated.

In an exemplary embodiment, the processor 70 may be embodied as, include or otherwise control any or all of a depth analyzer 78, a motion analyzer 80, a target tracker 82, a gesture recognizer 84 and a hand segmenter 86. However, in some embodiments, more or even less components could be included. The depth analyzer 78, the motion analyzer 80, the target tracker 82, the gesture recognizer 84 and the hand segmenter 86 may each be any means such as a device or circuitry embodied in hardware, software or a combination of hardware and software (e.g., processor 70 operating under software control) that is configured to perform the corresponding functions of the depth analyzer 78, the motion analyzer 80, the target tracker 82, the gesture recognizer 84, and the hand segmenter 86, respectively, as described below. In an exemplary embodiment, the depth analyzer 78, the motion analyzer 80, the target tracker 82, the gesture recognizer 84, and/or the hand segmenter 86 may each be in communication with a media capturing module (e.g., the camera module 137 of FIG. 6) to receive image data for use in analysis as described below.

The depth analyzer 78 may be configured to segment input image data for each frame into data corresponding to each of various different depth ranges. The depth analyzer 78 may then generate intensity images corresponding to each of the various different depth ranges. The depth analyzer 78 may be configured to utilize the information associated with the various depth ranges to then perform a determination or estimation of the coarse depth of the whole hand area. In this regard, for example, after the depth range of an image is partitioned into many ranges (evenly or unevenly distributed) from near to far, a count may be conducted of the number of pixels for any connected region in each range. If the pixel number exceeds a predefined threshold, the corresponding connected region may be identified as a candidate hand region and a candidate hand depth range D may be determined. An accurate hand depth D' may then be refined through the following steps:

1) Compute average hand depth by:

$$d = \sum_{d_i \in D} d_i,$$

that is an depth averaging for all pixels i whose depth is within the range D; and 2) Get accurate hand depth range D' by: D'=[d−T$_1$, d+T$_2$]. T is also an experiential value, for example, T$_1$=10, T$_2$=15.

After determining the hand depth range, a binary image can be formed, which may contain hand, arm and other regions.

For a first initialization stage, a recognition operation may be executed to verify a trigger gesture (e.g., a gesture which, when recognized, initiates tracking for future gesture analysis). Otherwise, during normal operation, a tracking strategy is used to eliminate disturbance regions such as the face, body and so on, to enable the identification of a coarse hand region (e.g., as in operation 14 above). In some instances (such as the top four examples in FIG. 3), the coarse hand depth region includes some pixels associated with the forearm. Since these pixels may complicate gesture recognition, a robust hand segmentation scheme may be desirable as provided by the hand segmenter 86.

The hand segmenter 86 may be any means such as a device or circuitry embodied in hardware, software or a combination of hardware and software that is configured to enable rough hand center estimation and use circle feature extraction to enable palm circle determination for hand segmentation as described herein. The hand segmenter 86 may be further configured to enable removal of undesirable portions of the coarse hand (or target) region to isolate the hand itself.

In an exemplary embodiment, the hand segmenter 86 may be configured to perform rough hand center estimation based on results of coarse hand region detection performed by the depth analyzer 78. In this regard, for example, the hand segmenter 86 may determine which part in the coarse region belongs to the hand. Geometrical information (e.g., circle features) that may be associated with being characteristic of a hand may be used to assist the hand segmenter 86. In this regard, experimental results have shown a geometrical feature having a relatively strong association with the hand, and a much weaker association with the forearm, may be the circle. Accordingly, by identifying circular features and analyzing such features, embodiments of the present invention may constrain gesture analysis to a region identified as corresponding to the hand, without considering forearm regions.

The hand segmenter 86 is configured to perform an estimate of the hand center region (which may be considered roughly circular in shape in many instances) as a step toward identifying the location of the palm of the hand. To accomplish rough hand center estimation, the hand segmenter 86 may be configured to assume that the depth of hand is smaller than forearm depth. Therefore, a rough hand location may be estimated using statistical information related to pixel depth. In particular, pixels with smaller or shallower depth (e.g., pixels corresponding to objects nearer to the 3D camera) may be considered to correspond to the hand. As such, mean position of pixels with smaller depth may be considered to correspond to the rough hand center $$C(x, y) = \frac{1}{N} \sum_{0 \leq d_{p_i} \leq d_T} (x_{p_i}, y_{p_i}),$$

where $d_{P_i}$ is the depth of the pixel $p_1$ and $d_T$ is the depth corresponding to the N-nearest pixel. FIG. 3C gives examples of rough hand center estimation results that may be provided by operation 16 above.

The hand segmenter 86 may also be configured to extract circle features from images (e.g., as described in relation to operation 18 above). In this regard, for example, since the palm is expected to have a strong likelihood of correlating to one of the circle features, circle feature extraction may be useful in achieving the ultimate goal of segmenting the hand for gesture analysis. In order to extract circle features from the course hand region determined in operation 14, the hand segmenter 86 of one exemplary embodiment of the present invention may utilize scale space feature detection. In this regard, a scale space representation of an image I may be shown as $$S(X; t) = \int_{\mathbb{R}^n} g(\xi; t) I(X - \xi) d\xi \text{ and } g(\xi; t) = \frac{1}{2\pi t^2} e^{-(x^2 + y^2)/(2t)}$$

is a Gaussian kernel with scale t. x=(x, y) and ξ=(x, y) are coordinates of pixels in the image. Circle features may be detected as local maxima in scale space of the square of a normalized Laplacian operator according to $B_{norm}S=t(\partial_{xx}S+\partial_{yy}S)$, where S is a scale space representation. The radius r of a detected circle feature is proportional to the scale of the detected circle feature. For a planar hand shape, scale-space feature detection may be effective to find the palm area. In practice, the detection is executed at a wide range of scales to find a palm of any size. Accordingly, there may be many circle features detected in coarse hand region as is shown in FIG. 3D.

To find one of the extracted circle features that corresponds to the palm area (e.g., palm location), several operations may be performed by the hand segmenter 86. In this regard, for example, among an extracted cluster of circle features (e.g., a circle cluster $b_{all}$), circle features may be selected that have a strong response to detectors in the given scale range. At a certain scale t, each feature has a value given by the detector at its position in the image and the maximum value may be denoted by $b_{max}$. Then features having values larger than $\alpha \cdot b_{max}$ may be reserved (e.g., in some examples, α is set to 0.1). The process may be repeated at each scale and these "strong features" in the given scale range may be gathered into a cluster $b_{all}$. The hand segmenter 86 may also be configured to select the circle feature $b_{max}$ with a maximum scale $t_{max}$ in the cluster $b_{all}$. The hand segmenter 86 may then denote the position of circle feature $b_{max}$ with its center P, if the distance between P and C is below a threshold (e.g., a threshold set to 0.5 r, where r is the radius of circle corresponding to $b_{max}$), $b_{max}$ may be the desired circle feature for the palm. Otherwise, delete $b_{max}$ from the cluster $b_{all}$ and repeat circle feature selection above. Some examples of results of palm locating are given in FIG. 3E. As shown in FIG. 3E, relatively accurate palm location may be accomplished by embodiments of the present invention.

In an exemplary embodiment, the hand segmenter 86 may be further configured to remove the forearm portion (or that portion that is not part of the hand as determined based on the palm location) from consideration. In some cases, the hand segmenter 86 may remove the forearm portion by cutting such portion out. In an exemplary embodiment, the hand segmenter 86 may be configured to determine a cutting direction and cutting position to aid in removal of the forearm portion. In some examples, the forearm portion may be cut out by a series of operations including determining whether the cutting direction is horizontal or vertical and determining the portion of the image to cut out.

Figures 5A, 5B, 5C, 5D:
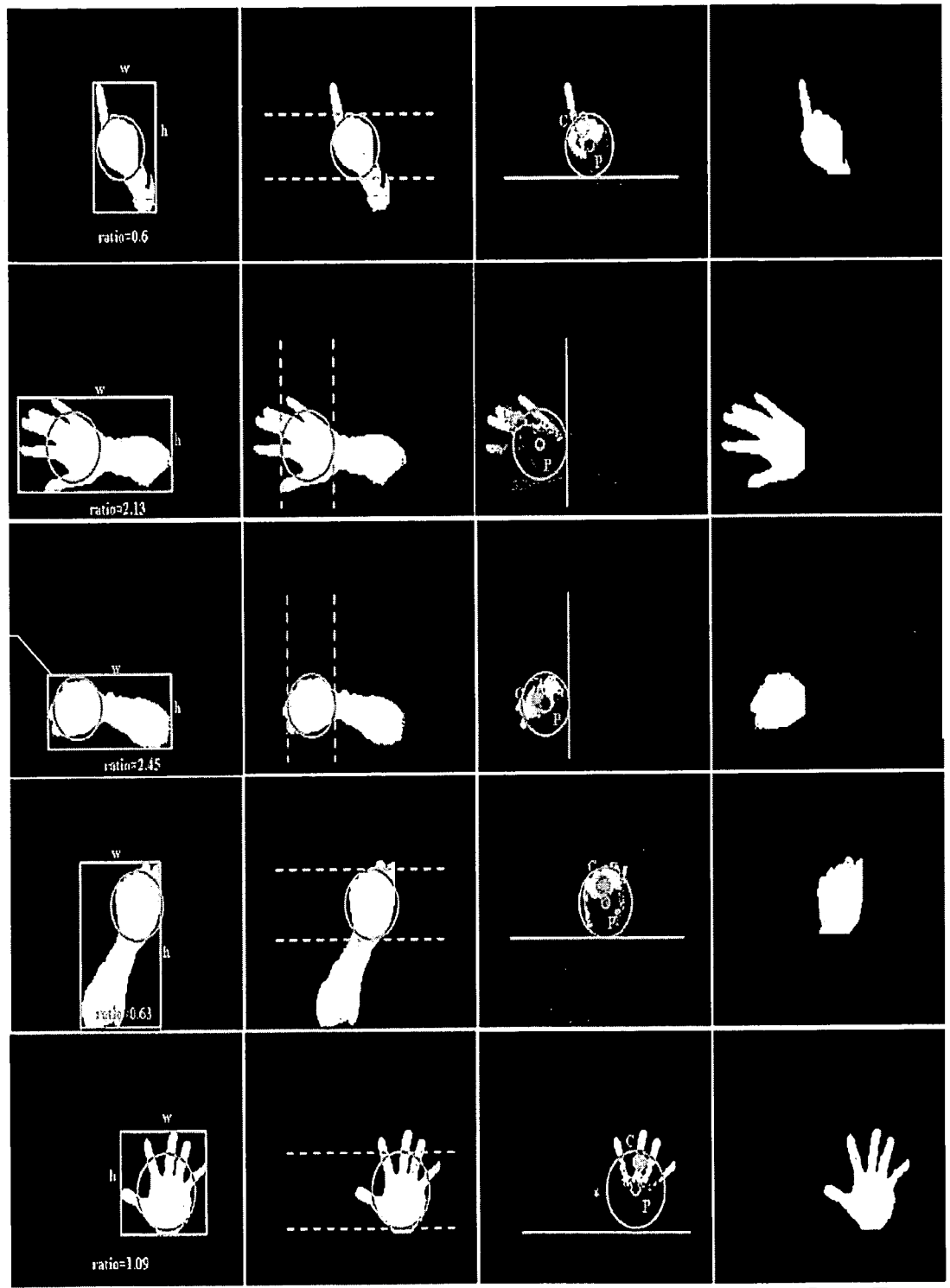
FIG. 5 (including FIGS. 5A through 5D) illustrates examples of a process for forearm portion removal with respect to various example images according to an exemplary embodiment of the present invention.

Determining the direction of cutting may be accomplished by initially determining a real aspect ratio of the coarse hand region: r=w/h. In this context, w and h are width and height, respectively, of a bounding rectangle or bounding box encompassing or containing the coarse hand region. FIG. 5 illustrates examples for forearm portion removal according to an exemplary embodiment. In this regard, as shown in FIG. 5A, several examples of coarse hand regions are provided with bounding boxes having a height h and a length w. Bounding box 90 is one example of such a box. Based on the ratio of length and width of the bounding box, the hand segmenter 86 may determine the cutting direction. For example, if the ratio is less than a threshold (e.g., r<T), then forearm cutting may be accomplished along a horizontal direction. Meanwhile, if r≧T, forearm cutting may be conducted along a vertical direction. T may be a pre-defined threshold that can be set based on an experiential value (e.g., T=1.2). When the determination regarding the ratio of height and length of the bounding box provides the cutting direction, two candidate cutting lines may be considered as shown in FIG. 5B. The two candidate cutting lines extend parallel to each other in the determined cutting direction (e.g., horizontal or vertical) and extend tangentially from opposite sides of the palm circle determined in operation 20. Cutting position determination may then select one of the two candidate cutting lines.

In order to select a candidate cutting line, the hand segmenter 86 may be configured to compare C, which roughly approximated the hand center at operation 16 and as shown by the dots in FIG. 3C, to a center of the palm circle P (indicated by a dot labeled P in the center of each palm circle in FIG. 5C. The spatial relationship between P and C, along with the determined cutting direction may then be used by the hand segmenter 86 to segment the hand accurately. In this regard, if r<T and C is above P, then the forearm is removed by a cut made horizontally at the bottom of palm circle (e.g., see the top example, bottom example, and the second from bottom example in FIG. 5D). Meanwhile, if r<T and C is below P, then the forearm is removed by a cut made horizontally at the top of palm circle. If r≧T and C is in the left of P, then the forearm is removed by a cut made vertically at the right end of palm circle (e.g., see the second from the top and middle examples in FIG. 5D). Meanwhile, if r≧T and C is in the right of P, then the forearm is removed by a cut made vertically at the left end of palm circle. Although not necessary, morphological open operations may be executed in the binary image after forearm cutting to eliminate some remaining portions of the forearm.

As a result of the operations above, and as shown in FIG. 5D, the remaining portions of the coarse hand region after the hand segmenter 86 operates to remove the forearm portion are mainly portions that directly correlate to the hand itself. Further analysis of the hand region and motion tracking may then be accomplished to enable gesture analysis and UI initiation based on the gestures recognized during such analysis.

Thus, for example, embodiments of the present invention may further include the motion analyzer 80, which may be configured to analyze data (e.g., segmented hand data) relative to adjacent frames of data. Thus, for example, the motion analyzer 80 may compare a hand segmented intensity image for a first frame to a hand segmented intensity image of a second frame (e.g., an adjacent frame) in order to detect motion from one frame to the next (e.g., motion variation). Using the obtained motion variation, the target tracker 82 may be configured to automatically track a target (e.g., the user's hand) in various image frames containing the target. Based on the above described mechanism for determining hand location, hand tracking may be accomplished over consecutive frames to enable gesture detection.

Some embodiments may also employ the gesture recognizer 84, which may be configured to perform gesture matching between features associated with the target and features associated with a particular known gesture. For example, a database of known gestures and their respective features may be provided for comparison to features of a current gesture. If similarity between compared gestures is sufficient, the gesture recognizer 84 may associate a current gesture with the particular known gesture thereby identifying or recognizing the current gesture.

In an exemplary embodiment, the database of known gestures may be generated by the user (or by another) in an offline phase. Thus, multiple samples for each gesture may be collected to compose a gallery of gestures. In an exemplary embodiment, size normalization may initially be performed and each sample may be transformed into a feature vector according to the above described scheme and recorded as a template to be used for matching purposes. A recognized gesture may be utilized to trigger or cause execution of a particular command associated with the recognized gesture. In this regard, for example, the gesture recognizer 84 may communicate the identity of a recognized gesture to the processor 70, which may execute (e.g., directly or via the user interface 72) a corresponding UI command. The command may be used to direct a UI system to execute a corresponding operation.

Based on the descriptions above, some embodiments of the present invention provide for segmentation of images to locate a target (e.g., a hand) to enable robust tracking in an efficient manner. Accordingly, relatively accurate target tracking results and hand gesture recognition rate may be improved. Use of the 3D camera enables the provision of 3D depth data in real time, which may be used by embodiments of the present invention to eliminate or substantially reduce the effect of the background and illumination on gesture recognition accuracy. In some cases, the partitioning of depth ranges also assists with respect to providing a coarse hand region. In an exemplary embodiment, a center for the coarse hand region is determined and circle features within the coarse hand region are identified. A palm circle is then identified and used to assist in removing the forearm portion (or other undesirable portions) from the images to segment the hand portion. Forearm portion removal, according to an example embodiment, includes determining the cutting direction based on a ratio of the dimensions of the coarse hand region (e.g., as defined by a bounding box) and selecting the cutting position based on characteristics of the palm circle and a relationship between the center of the palm circle and the center of the course hand region. More accurate tracking may thereafter be employed and, based on the accurate hand segmentation and tracking results, gesture recognition accuracy can be improved accordingly. Thus, for example, tracking and recognition performance may be improved and interaction usability may also be improved.

Accordingly, embodiments of the present invention may provide a transformation of data representing a hand and numerous other physical objects, into a graphical representation of the hand alone (or nearly alone) so that the graphical representation of the hand can be tracked and analyzed. User interface commands may thereafter be accomplished on the basis of recognized hand gestures.

Figure 6:
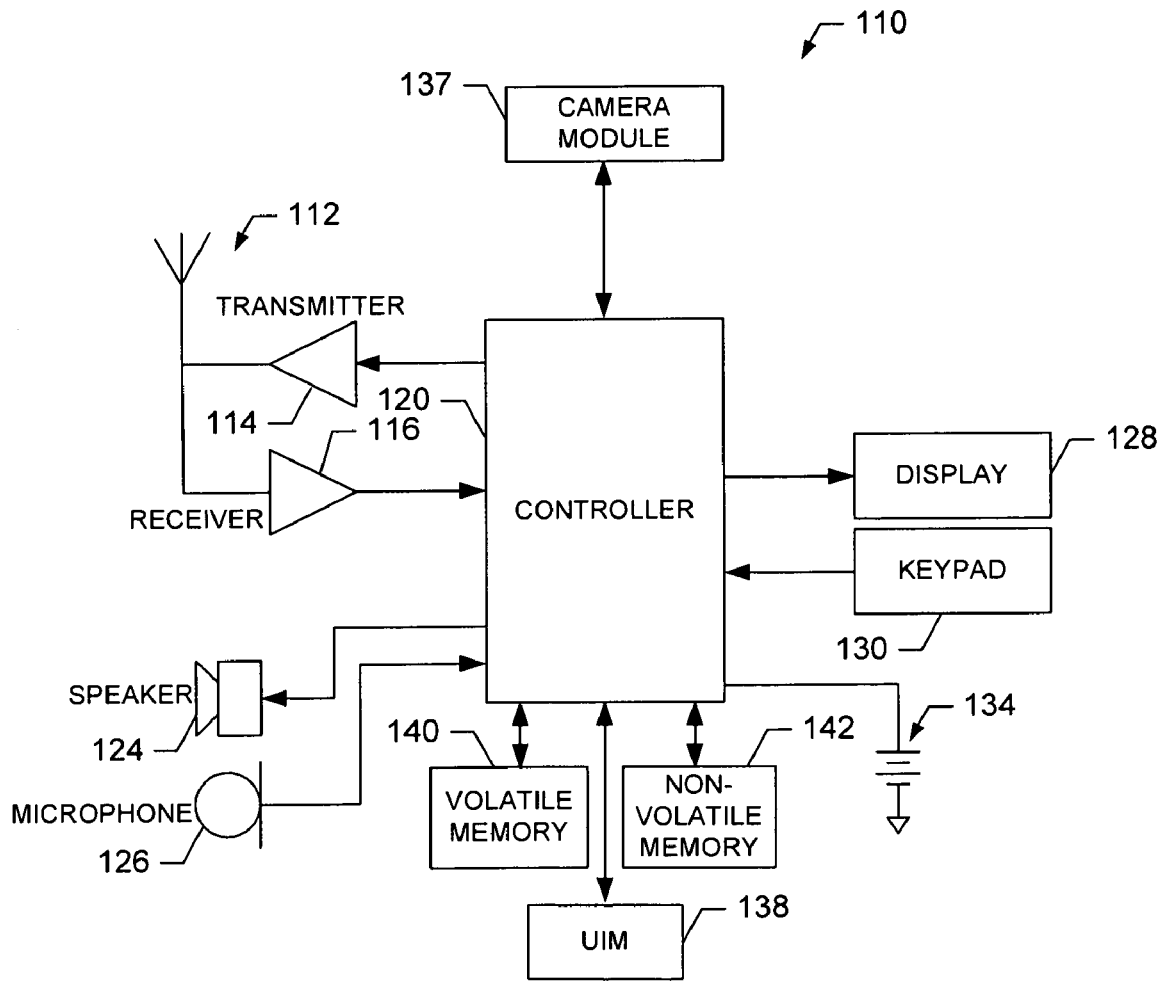
FIG. 6 illustrates a block diagram of a mobile terminal that may benefit from exemplary embodiments of the present invention.

An exemplary embodiment of the invention will now be described with reference to FIG. 6, in which certain elements of an apparatus for enabling adaptive gesture analysis are displayed. As such, FIG. 6 illustrates a block diagram of a mobile terminal 110 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In addition, while several embodiments of the method of the present invention may be performed or used by or in connection with a mobile terminal 110, the method may be employed by or used in connection with devices other than a mobile terminal (e.g., personal computers (PCs), servers, or the like). Moreover, the system and method of embodiments of the present invention may have been primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 110 may include an antenna 112 (or multiple antennas) in operable communication with a transmitter 114 and a receiver 116. The mobile terminal 110 may further include an apparatus, such as a controller 120 (e.g., processor 70) or other processing element, that provides signals to and receives signals from the transmitter 114 and receiver 116, respectively. The signals may include signaling information in accordance with the air interface standard of the applicable cellular system, and/or may also include data corresponding to speech, received data and/or user generated/transmitted data. In this regard, the mobile terminal 110 may be capable of operating with one or more air interface standards, communication protocols, modulation types, and access types. By way of illustration, the mobile terminal 110 may be capable of operating in accordance with any of a number of first, second, third and/or fourth-generation communication protocols or the like. For example, the mobile terminal 110 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 110 may be capable of operating in accordance with non-cellular communication mechanisms. For example, the mobile terminal 110 may be capable of communication in a wireless local area network (WLAN) or other communication networks.

It is understood that the apparatus, such as the controller 120, may include circuitry for implementing, among others, audio/video and logic functions of the mobile terminal 110. For example, the controller 120 may comprise a digital signal processor device, a microprocessor device, and various analog to digital converters, digital to analog converters, and/or other support circuits. Control and signal processing functions of the mobile terminal 110 may be allocated between these devices according to their respective capabilities. The controller 120 thus may also include the functionality to encode and interleave message and data prior to modulation and transmission. The controller 120 may additionally include an internal voice coder, and may include an internal data modem. Further, the controller 120 may include functionality to operate one or more software programs, which may be stored in memory. For example, the controller 120 may be capable of operating a connectivity program, such as a conventional web browser. The connectivity program may then allow the mobile terminal 110 to transmit and receive web content, such as location-based content and/or other web page content, according to a Wireless Application Protocol (WAP), Hypertext Transfer Protocol (HTTP) and/or the like, for example.

The mobile terminal 110 may also comprise a user interface including an output device such as an earphone or speaker 124, a microphone 126, a display 128, and a user input interface, which may be operationally coupled to the controller 120. The user input interface, which allows the mobile terminal 110 to receive data, may include any of a number of devices allowing the mobile terminal 110 to receive data, such as a keypad 130, a touch display (not shown) or other input device. In embodiments including the keypad 130, the keypad 130 may include numeric (0-9) and related keys (#, *), and other hard and soft keys used for operating the mobile terminal 110. Alternatively, the keypad 130 may include a QWERTY keypad arrangement. The keypad 130 may also include various soft keys with associated functions. In addition, or alternatively, the mobile terminal 110 may include an interface device such as a joystick or other user input interface. The mobile terminal 110 further includes a battery 134, such as a vibrating battery pack, for powering various circuits that are used to operate the mobile terminal 110, as well as optionally providing mechanical vibration as a detectable output.

The mobile terminal 110 may further include a user identity module (UIM) 138. The UIM 138 is typically a memory device having a processor built in. The UIM 138 may include, for example, a subscriber identity module (SIM), a universal integrated circuit card (UICC), a universal subscriber identity module (USIM), a removable user identity module (R-UIM), etc. The UIM 138 typically stores information elements related to a mobile subscriber. In addition to the UIM 138, the mobile terminal 110 may be equipped with memory. The mobile terminal 10 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 140 non-volatile memory 142 may include a cache area for temporary storage of data. The memories can store any of a number of pieces of information, and data, used by the mobile terminal 110 to implement the functions of the mobile terminal 110.

In an exemplary embodiment, the mobile terminal 110 may include a media capturing module, such as a camera, video and/or audio module, in communication with the controller 120. The media capturing module may be any means for capturing an image, video and/or audio for storage, display or transmission. For example, in an exemplary embodiment in which the media capturing module is a camera module 137, the camera module 137 may include a digital camera capable of forming a digital image file from a captured image. As such, the camera module 137 may include all hardware, such as a lens or other optical device, and software necessary for creating a digital image file from a captured image. In an exemplary embodiment, the camera module 137 may be a 3D camera capable of capturing 3D image information indicative of depth and intensity.

Embodiments of the present invention may provide a mechanism for conducting coarse hand position determination in a natural interaction environment through analysis of pixel distribution. The extraction of the circle features may enable location of a palm area in a manner that is relatively insensitive to scale. The palm area may be located accurately based on a circle feature, which is selected based on a roughly determined hand center constraint. An aspect ratio of a shape bounding the coarse hand region may be used to determine whether the forearm should be cut in vertical or horizontal directions. Furthermore, the pixel distribution according to depth information may assist in determining cutting position. Based on accurate hand segmentation results, the performance of the following gesture recognition may be enhanced tremendously. Based on the good segmentation and recognition performance, the interaction usability can be greatly improved.

Figure 7:
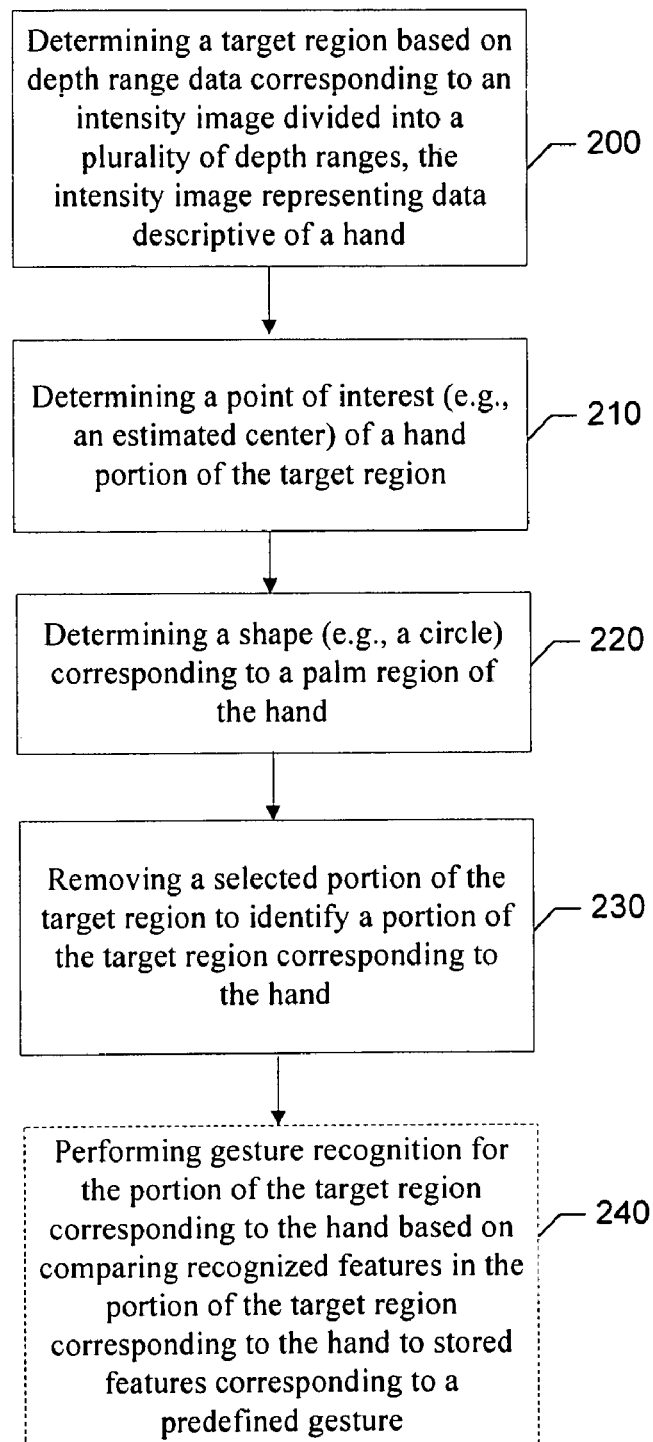
FIG. 7 is a flowchart according to an exemplary method for providing hand segmentation for gesture analysis according to an exemplary embodiment of the present invention.

FIG. 7 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing hand segmentation for gesture analysis as illustrated, for example, in FIG. 7 may include determining a target region based at least in part on depth range data corresponding to an intensity image (e.g., divided into a plurality of depth ranges) at operation 200. The intensity image may be representing data descriptive of a hand. The method may further include determining a point of interest (e.g., an estimated center) of a hand portion of the target region at operation 210 and determining a shape (e.g., a circle or other geometric shape) corresponding to a palm region of the hand at operation 220. The method may also include removing a selected portion of the target region to identify a portion of the target region corresponding to the hand at operation 230.

In an exemplary embodiment, the method may include further optional operations as well, some examples of which are shown in FIG. 7 in dashed lines. In this regard, exemplary additional operations may include operation 240 of performing gesture recognition for the portion of the target region corresponding to the hand based on comparing recognized features in the portion of the target region corresponding to the hand to stored features corresponding to a predefined gesture.

In some embodiments, certain ones of the operations above may be modified or further amplified as described below. It should be appreciated that each of the modifications or amplifications below may be included with the operations above either alone or in combination with any others among the features described herein. In this regard, for example, determining the circle corresponding to the palm region of the hand may include determining the circle from among a plurality of circle features extracted from the target region. In some cases, removing the selected portion of the target region may include determining a cutting direction for removal of the selected portion based on characteristics of the target region. In this regard, determining the cutting direction based on characteristics of the target region may include selecting a horizontal or vertical cutting direction based on a ratio between height and width of a bounding box confining the target region. In an exemplary embodiment, removing the selected portion of the target region may include determining a cutting position for removal of the selected portion based on characteristics of the target region and a relationship between a center of the palm region and the estimated center of the hand portion of the target region.

In an exemplary embodiment, an apparatus for performing the method of FIG. 7 above may comprise a processor (e.g., the processor 70) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the processor 70, the depth analyzer 78 (e.g., operation 200), the hand segmenter 86 (e.g., operations 210-240), or an algorithm executed by the processor for controlling the processing of data as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
a processor; and
a memory including computer program code, the memory and the computer program code configured to, with the processor, cause the apparatus to at least:
determine a target region based at least in part on depth range data corresponding to an intensity image, the intensity image comprising data descriptive of a hand;
determine a point of interest of a hand portion of the target region;
determine a shape corresponding to a palm region of the hand, wherein the shape corresponds to a circle determined from a plurality of circle features extracted from the target region;
determine a selected portion of the target region for removal based on a relationship between a center of the palm region and the point of interest of the hand portion of the target region; and
remove the selected portion of the target region to identify a portion of the target region corresponding to the hand.

2. The apparatus of claim 1, wherein the memory including the computer program code is further configured to, with the processor, cause the apparatus to remove the selected portion of the target region by determining a cutting direction for removal of the selected portion based on characteristics of the target region.

3. The apparatus of claim 2, wherein the memory including the computer program code is further configured to, with the processor, cause the apparatus to determine the cutting direction based on characteristics of the target region by selecting a horizontal or vertical cutting direction based on a ratio between height and width of a bounding box confining the target region.

4. The apparatus of claim 1, wherein the memory including the computer program code is further configured to, with the processor, cause the apparatus to remove the selected portion of the target region by determining a cutting position for removal of the selected portion based on characteristics of the target region and the relationship between the center of the palm region and the point of interest of the hand portion of the target region.

5. The apparatus of claim 1, wherein the memory including the computer program code is further configured to, with the processor, cause the apparatus to perform gesture recognition for the portion of the target region corresponding to the hand based on comparing recognized features in the portion of the target region corresponding to the hand to stored features corresponding to a predefined gesture.

6. The apparatus of claim 5, wherein the memory including the computer program code is further configured to, with the processor, cause the apparatus to execute a user interface command based on a recognized gesture.

7. A method comprising:
   determining a target region based at least in part on depth range data corresponding to an intensity image, the intensity image comprising data descriptive of a hand;
   determining a point of interest of a hand portion of the target region;
   determining a shape corresponding to a palm region of the hand, wherein the shape corresponds to a circle determined from a plurality of circle features extracted from the target region;
   determining a selected portion of the target region for removal based on a relationship between a center of the palm region and the point of interest of the hand portion of the target region; and
   removing the selected portion of the target region to identify a portion of the target region corresponding to the hand.

8. The method of claim 7, wherein removing the selected portion of the target region comprises determining a cutting direction for removal of the selected portion based on characteristics of the target region.

9. The method of claim 8, wherein determining the cutting direction based on characteristics of the target region comprises selecting a horizontal or vertical cutting direction based on a ratio between height and width of a bounding box confining the target region.

10. The method of claim 7, wherein removing the selected portion of the target region comprises determining a cutting position for removal of the selected portion based on characteristics of the target region and the relationship between the center of the palm region and the point of interest of the hand portion of the target region.

11. The method of claim 7, further comprising performing gesture recognition for the portion of the target region corresponding to the hand based on comparing recognized features in the portion of the target region corresponding to the hand to stored features corresponding to a predefined gesture.

12. A computer program product comprising at least one computer-readable non-transitory storage medium having computer-executable program code instructions stored therein, the computer-executable program code instructions comprising:
   program code instructions for determining a target region based at least in part on depth range data corresponding to an intensity image, the intensity image comprising data descriptive of a hand;
   program code instructions for determining a point of interest of a hand portion of the target region;
   program code instructions for determining a shape corresponding to a palm region of the hand, wherein the shape corresponds to a circle determined from a plurality of circle features extracted from the target region;
   program code instructions for determining a selected portion of the target region for removal based on a relationship between a center of the palm region and the point of interest of the hand portion of the target region; and
   program code instructions for removing the selected portion of the target region to identify a portion of the target region corresponding to the hand.

13. The computer program product of claim 12, wherein program code instructions for removing the selected portion of the target region includes instructions for determining a cutting direction for removal of the selected portion based on characteristics of the target region.

14. The computer program product of claim 13, wherein program code instructions for determining the cutting direction based on characteristics of the target region includes instructions for selecting a horizontal or vertical cutting direction based on a ratio between height and width of a bounding box confining the target region.

15. The computer program product of claim 12, wherein program code instructions for removing the selected portion of the target region includes instructions for determining a cutting position for removal of the selected portion based on characteristics of the target region and the relationship between the center of the palm region and the point of interest of the hand portion of the target region.

16. The computer program product of claim 12, further comprising program code instructions for performing gesture recognition for the portion of the target region corresponding to the hand based on comparing recognized features in the portion of the target region corresponding to the hand to stored features corresponding to a predefined gesture.

17. An apparatus comprising:
   means for determining a target region based at least in part on depth range data corresponding to an intensity image, the intensity image comprising data descriptive of a hand;
   means for determining a point of interest of a hand portion of the target region;
   means for determining a shape corresponding to a palm region of the hand, wherein the shape corresponds to a circle determined from a plurality of circle features extracted from the target region;
   means for determining a selected portion of the target region for removal based on a relationship between a center of the palm region and the point of interest of the hand portion of the target region; and
   means for removing a selected portion of the target region to identify a portion of the target region corresponding to the hand.

* * * * *

UNITED STATES PATENT AND TRADEMARK OFFICE
CERTIFICATE OF CORRECTION

PATENT NO. : 8,379,987 B2  
APPLICATION NO. : 12/346123  
DATED : February 19, 2013  
INVENTOR(S) : Chai et al.

Page 1 of 1

It is certified that error appears in the above-identified patent and that said Letters Patent is hereby corrected as shown below:

In the Specification

Column 9,
Line 9, "pixel $p_1$" should read --pixel $p_i$--;
Line 28, should appear as follows:

$$S(X;t) = \int_{\xi \in \Re^2} g(\xi;t) I(X-\xi) d\xi \quad \text{and} \quad g(\xi;t) = \frac{1}{2\pi t^2} e^{-(x^2+y^2)/(2t)}$$

Signed and Sealed this
Twenty-seventh Day of August, 2013

Teresa Stanek Rea
*Acting Director of the United States Patent and Trademark Office*